(12) United States Patent
Speck

(10) Patent No.: US 12,553,851 B2
(45) Date of Patent: Feb. 17, 2026

(54) SENSOR ELEMENT FOR A POTENTIOMETRIC SENSOR AND PRODUCTION METHOD

(71) Applicant: Endress+Hauser Conducta GmbH+Co. KG, Gerlingen (DE)

(72) Inventor: Matthäus Speck, Göpfersdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 868 days.

(21) Appl. No.: 17/637,071

(22) PCT Filed: Aug. 18, 2020

(86) PCT No.: PCT/EP2020/073092
§ 371 (c)(1),
(2) Date: Feb. 21, 2022

(87) PCT Pub. No.: WO2021/032737
PCT Pub. Date: Feb. 25, 2021

(65) Prior Publication Data
US 2022/0365021 A1    Nov. 17, 2022

(30) Foreign Application Priority Data

Aug. 21, 2019  (DE) .................... 10 2019 122 519.1
Aug. 21, 2019  (DE) .................... 10 2019 122 520.5
(Continued)

(51) Int. Cl.
G01N 27/333    (2006.01)
C03C 4/18      (2006.01)
(Continued)

(52) U.S. Cl.
CPC ............. *G01N 27/333* (2013.01); *C03C 4/18* (2013.01); *C03C 27/02* (2013.01); *C23D 5/005* (2013.01); *G01N 27/301* (2013.01); *G01N 27/36* (2013.01)

(58) Field of Classification Search
CPC .... G01N 27/333; G01N 27/301; G01N 27/26; G01N 27/30; G01N 27/36; C03C 4/18; C03C 27/02; C23D 5/005
See application file for complete search history.

(56) References Cited

U.S. PATENT DOCUMENTS

| 3,458,422 A | 7/1969 | Metz et al. |
| 3,498,901 A | 3/1970 | Metz et al. |

(Continued)

FOREIGN PATENT DOCUMENTS

| CN | 1098502 A   | 2/1995 |
| CN | 107037107 A | 8/2017 |

(Continued)

OTHER PUBLICATIONS

General Electric et al., English translation of DE2220841A1, 1972 (Year: 1972).*

(Continued)

*Primary Examiner* — Shizhi Qian
(74) *Attorney, Agent, or Firm* — Gil M. Repa; Endress+Hauser (USA) Holding, Inc.

(57) ABSTRACT

The present disclosure relates to a sensor element for a potentiometric sensor, including a substrate and an ion-selective enamel layer arranged on the substrate. The substrate has at least one region which is electroconductively connected to the ion-selective enamel layer. The region of the substrate, which is electroconductively connected to the sensor layer, is made of a copper-based alloy having a mass fraction of at least 60% of copper.

7 Claims, 2 Drawing Sheets

(30) Foreign Application Priority Data

Dec. 6, 2019 (DE) .................. 10 2019 133 455.1
Dec. 6, 2019 (DE) .................. 10 2019 133 458.6

(51) Int. Cl.

| | |
|---|---|
| *C03C 27/02* | (2006.01) |
| *C23D 5/00* | (2006.01) |
| *G01N 27/30* | (2006.01) |
| *G01N 27/36* | (2006.01) |

(56) References Cited

U.S. PATENT DOCUMENTS

| | | | | |
|---|---|---|---|---|
| 3,787,307 | A * | 1/1974 | Schwab | ........... G01N 27/36 |
| | | | | 204/419 |
| 4,133,735 | A | 1/1979 | Afromowitz et al. | |
| 2022/0230787 | A1 * | 7/2022 | Tanaka | ............... C03C 29/00 |

FOREIGN PATENT DOCUMENTS

| | | |
|---|---|---|
| CN | 109752435 A | 5/2019 |
| CN | 109828008 A | 5/2019 |
| CN | 109906374 A | 6/2019 |
| DE | 1291139 | 6/1964 |
| DE | 2050050 A | 11/1971 |
| DE | 2133419 B1 | 11/1972 |
| DE | 2220841 A1 | 11/1972 |
| DE | 2721939 A1 | 11/1978 |
| DE | 2746612 A1 * | 4/1979 |
| DE | 3437619 A1 | 4/1986 |
| DE | 3727485 A1 | 3/1988 |
| DE | 19714474 A1 | 10/1998 |
| DE | 102005059680 A1 * | 6/2007 ............. G01N 27/36 |
| DE | 102007016197 A1 | 10/2008 |
| DE | 102013101420 A1 | 8/2014 |
| DE | 102013019636 A1 | 5/2015 |
| DE | 102015121364 A1 | 6/2017 |
| DE | 102016202083 A1 | 8/2017 |
| DE | 102016005943 A1 | 11/2017 |
| DE | 102019108890 A1 | 10/2019 |
| EP | 0223092 A2 * | 5/1987 |
| EP | 1231189 A1 | 8/2002 |
| GB | 1420126 | 1/1976 |
| GB | 1420126 A | 1/1976 |
| WO | 2017137346 A1 | 8/2017 |
| WO | 2018069491 A1 | 4/2018 |

OTHER PUBLICATIONS

Heerde et al., English translation of EP0223092A2, 1987 (Year: 1987).*

Bellinger et al., DE2746612A1, English translation, 1979 (Year: 1979).*

Yoshiki et al., Electroless copper plating using ZnO thin film coated on a glass substrate, J. Electrochem. Soc., 1994, 141, L56 (Year: 1994).*

* cited by examiner

SENSOR ELEMENT FOR A POTENTIOMETRIC SENSOR AND PRODUCTION METHOD

CROSS-REFERENCE TO RELATED APPLICATIONS

The present application is related to and claims the priority benefit of German Patent Application Nos. 10 2019 122 519.1 filed on Aug. 21, 2019, 10 2019 122 520.5 filed on Aug. 21, 2019, 10 2019 133 455.1 filed on Dec. 6, 2019, 10 2019 133 458.6 filed on Dec. 6, 2019 and International Patent Application No. PCT/EP2020/073092 filed on Aug. 18, 2020, the entire contents of which are incorporated herein by reference.

TECHNICAL FIELD

The invention relates to a sensor element for a potentiometric sensor, to a potentiometric sensor, and to a method for manufacturing a sensor element for a potentiometric sensor.

BACKGROUND

Potentiometric sensors are used in laboratory and process measurement technology in many areas of chemistry, biochemistry, pharmacy, biotechnology, food technology, water management, and environmental measurement technology for the analysis of measuring media, especially, measuring liquids. Potentiometric sensors allow detection of activities of chemical substances, such as ion activities, and correlated measured variables in liquids. The substance, the activity or concentration of which is to be measured is also referred to as an analyte. The measuring medium can be a measuring liquid, such as an aqueous solution, emulsion, or suspension.

Potentiometric sensors generally comprise a measuring electrode and a reference electrode as well as a sensor circuit for detecting measured values and for signal processing. The measuring and reference electrodes can be combined in a measuring probe which can be immersed in the measuring fluid. This measuring probe can also comprise the sensor circuit or at least part of the sensor circuit. The measuring probe can be connected for communication to a higher-level unit, for example, a measuring transducer, an electronic operating device, a computer, or a controller, via a cable or wirelessly. The higher-level unit can be used for further processing the measurement signals or measured values detected by means of the measuring probe and for operating the measuring probe.

In contact with the measuring medium, the measuring electrode forms a potential that is a function of the activity of the analyte in the measuring medium, whereas the reference electrode provides a stable reference potential independent of the analyte concentration. The sensor circuit generates an analog or digital measurement signal which represents the electric voltage (potential difference) between the measuring electrode and the reference electrode and, consequently, the activity of the analyte in the measuring medium. The measurement signal may be output from the sensor circuit to the higher-level unit, which further processes the measurement signal. A partial or complete further processing of the measurement signal in the sensor circuit in the measuring probe is also possible.

The reference electrode of conventional potentiometric sensors is often designed as a second-type electrode, e.g., as a silver/silver chloride reference electrode, and is electrically conductively connected to the sensor circuit. It can comprise a housing and a reference element, e.g. a silver wire coated with silver chloride, which is arranged in the housing and which is in electrolytically conductive and/or ion-conducting contact with the measuring fluid in measuring operation via a reference electrolyte contained in the housing and an electrochemical bridge, e.g. a diaphragm.

The measuring electrode comprises a potential-forming sensor element which comprises an ion-selective membrane, depending upon the type of the potentiometric sensor. Examples of such measuring electrodes are ion-selective electrodes (ISE). A traditional ion-selective electrode has a housing that is closed by the ion-selective membrane and accommodates an inner electrolyte that is in contact with the membrane. The ion-selective electrode also comprises a terminal lead which is in contact with the inner electrolyte. The terminal lead is electrically conductively connected to the sensor circuit. If the ion-selective membrane for measuring is in contact with the measuring medium, the membrane selectively interacts with a specific ionic species contained in the measuring medium, namely with the analyte. Changing the activity or concentration of the ion in the measuring medium causes a relative change in the equilibrium galvanic voltage between the measuring medium and the terminal lead in contact with the ion-selective membrane via the inner electrolyte. A special case of such an ion-selective electrode, i.e., an electrode that selectively detects the hydronium ion activity in a measuring liquid, is the known pH glass electrode, which comprises a glass membrane as the potential-forming sensor element. The terms "ion-selective layer," "membrane," or "electrode" used here and hereinafter refer to an ion-sensitive layer, membrane, or electrode, the potential of which is preferably predominantly influenced by the analyte, e.g., a specific ion type or the pH value, wherein cross-sensitivities of the layer, membrane, or electrode for other types of ions are not excluded but are preferably low. The term "ion-selective glass" refers to a glass which is suitable for forming such an ion-selective layer, membrane, or electrode.

It has long been attempted to improve the design of measuring electrodes of potentiometric sensors with the goal of saving costs, simplifying manufacture, and greater robustness and longer service life. One approach that has been picked up again and again is the use of a solid terminal lead, which does not require an inner electrolyte contacting the ion-selective membrane.

An ion-selective electrode with a solid terminal lead (also referred to as fixed contact electrode) is described in WO 2018/069491 A1. This electrode comprises a measuring element with an ion-selective layer that, during operation, is in contact with a measuring medium and is conductive for lithium ions. Furthermore, the measuring element has an electrically conductive layer that comprises metallic lithium, a lithium-(0) alloy, or an electrically conductive lithium compound. The measuring element also comprises a solid electrolyte layer, which is arranged between the ion-selective layer and the electrically conductive layer. The measuring element comprises a series of further layers which serve to protect the lithium-containing conductive layer from oxygen or moisture and to contact the ion-selective layer. The manufacture of the sensor element therefore requires a series of individual steps for constructing the layer stack and is correspondingly complex.

A pH sensor is known from DE 10-2016-202 083 A1 which has a terminal electrode with a metallic reference electrode as a metallic solid terminal lead and a pH-sensitive glass membrane made of lithium-silicate glass applied to the reference electrode, and which further has a contact region made of a contact metal, e.g. copper, forming monovalent metal cations on the outer side of the metallic reference electrode. The glass membrane is doped with the monovalent metal cations from the contact region of the reference electrode in such a way that a defined sensor potential is formed.

DE 1291139 B describes a glass electrode having a terminal electrode made of metal, preferably of copper, which has an oxide skin on the surface onto which a glass layer is fused.

DE 22 20 841 A describes a method for producing ion-selective electrodes, with which a palladium wire plated with copper is coated with pH-sensitive glass, wherein the wire is heated at 850° C. in a flowing oxygen atmosphere and then the hot wire is immersed in pulverized glass. The wire is then heated again in order to fuse thereon the glass particles.

In Belford, R. E., Owen, A. E., Kelly, R. G., Thickfilm hybrid pH sensor, Sensors and Actuators Vol. 11, 1987, pp. 387-398, a production method for pH sensors in thick-film technology is described in which a pH glass film is applied to a printed metal conductor track. The conductor track is printed by means of a diluted Au/Pt paste. Between the conductor track and a glass film applied thereto, a metal oxide intermediate layer is produced by vapor deposition of copper or iron onto the printed conductor track and heating in air.

U.S. Pat. No. 4,133,735 A describes glass electrodes with a solid terminal lead, which have a conductor with a surface layer made of an electrochemically active material, e.g. copper. This surface layer has a first coating of a mixture of glass and a halogen of the active metal. An ion-sensitive glass coating is applied to this first coating by dipping the conductor into a melt of an ion-sensitive glass.

Some other approaches for providing electrodes with a solid terminal lead are described in the textbook H. Galster, "pH-Messung—Grundlagen, Methoden, Anwendungen, Geräte" [pH Measurement—Fundamentals, Methods, Applications, Devices], VCH Verlagsgesellschaft mbH, Weinheim, 1990, pp. 135-136. One of these approaches is formed by so-called enamel electrodes, which are typically constructed from a plurality of layers of different composition, the uppermost layer being formed from a pH-selective enamel layer.

The following is noted with respect to the term "enamel electrode" or "ion- or pH-selective enamel layer:" According to the definitions/labeling standards, RAL registration RAL-RG 529 A2 from July 2007 by RAL Deutsches Institut für Gütesicherung and Kennzeichnung e.V. [RAL German Institute for Quality Assurance and Certification, registered association], a vitreous material that is produced by completely or partially melting substantially oxidic raw materials is referred to as an enamel. The inorganic preparation thus produced is applied with additives in one or more layers to workpieces made of metal or glass and fused at temperatures above 480° C. Base constituents of (ion-selective) enamel layers are, for example, one or more of the oxides silicon oxide, sodium oxide, potassium oxide, calcium oxide, magnesium oxide, and aluminum oxide. In addition to the RAL definitions, a definition attributable to Adolf Dietzel and Hans Kyri is also common, according to which enamel is a preferably glassy solidified composition, produced by melting or fritting, with inorganic, mainly oxidic composition, which is to be fused or has been fused to workpieces of metal or glass in one or more layers, partly with aggregates.

An ion-selective glass, e.g., pH glass, applied to a metallic base body using a method used in the RAL definition or by fusing onto or to a substrate is therefore referred to hereinafter in the style of these definitions as an ion-selective enamel layer or, in the case of an enamel layer specifically selective for hydronium ions, as a pH enamel layer, and a corresponding electrode as an enamel electrode.

Enamel electrodes are characterized by high mechanical stability and can be hygienically designed by providing an enamel coating covering all parts of the probe coming into contact with the process. They can therefore be used especially advantageously in processes of the food industry and in chemical processes in which frequent purifications are to be carried out.

Two examples of enamel electrodes are given in the aforementioned textbook by H. Galster. In a first example, an insulation enamel layer is arranged on an iron substrate, a silver layer is arranged on the insulation enamel layer, and a pH-selective enamel layer is arranged on the silver layer. The silver layer serves as electrical terminal lead in this example. In a second example, a Pt/Pd layer is applied to a ceramic substrate of forsterite, an adhesive oxide layer of CuO/FeO is applied thereover, and a pH-selective enamel layer of MacInnes glass is applied thereover. The individual layers are applied by means of thick film technology. The final ion-selective layer is applied according to the screen-printing process. A paste of ground MacInnes glass with a suitable binder is used for this purpose and is subsequently baked at 850° C. The manufacture of many of the sensor elements known from the prior art for potentiometric sensors is relatively complex and requires some or even a multiplicity of individual manufacturing steps. A reproducible and stable quality of the sensor elements produced in this way is also desirable.

SUMMARY

The object of the present invention is therefore to specify an improved sensor element for a potentiometric sensor that has a solid terminal lead and is easy to manufacture. It is a further object of the present invention to specify a simple manufacturing method for such a sensor element. This object is achieved by the sensor element and the method according to the present disclosure. Advantageous embodiments are listed in the dependent claims.

The sensor element according to the invention for a potentiometric sensor comprises:
 a substrate, and
 an ion-selective enamel layer arranged on the substrate,
 wherein the substrate has at least one region electrically conductively connected to the ion-selective enamel layer,
 and wherein the region of the substrate electrically conductively connected to the ion-selective enamel layer is made of a copper-based alloy having a mass fraction of at least 60% copper.

The sensor element is of very simple construction since the enamel layer as sensor layer and the region of the substrate electrically conductively connected thereto already form a fully functional solid-contact electrode. Accordingly, the manufacturing of the sensor element is also very simple in comparison with solid-contact electrodes known from the prior art and requires only a few method steps. The ion-selective enamel layer can be a pH-enamel layer.

It has been found that the sensor element according to the invention is also unexpectedly robust to mechanical and thermal loads. According to the technical knowledge, it is an essential requirement for the mechanical stability of solid-contact electrodes that are exposed to mechanical or thermal loads that the thermal expansion coefficients of the materials involved coincide as much as possible but at least differ by no more than 10%. Thermal expansion coefficients of known ion-selective glasses, e.g., pH glasses such as MacInnes glass, Corning 015 glass or, for example, the glasses known from U.S. Pat. No. 3,458,422 are of the order of $10 \cdot 10^{-6}$ $K^{-1}$. For example, the expansion coefficient of Corning 015 glass is $11 \cdot 10^{-6}$ $K^{-1}$ or that of the glasses known from U.S. Pat. No. 3,458,422 is between 9.3 and $10.4 \cdot 10^{-6}$ $K^{-1}$. Copper, on the other hand, has a thermal expansion coefficient of $16.5 \cdot 10^{-6}$ $K^{-1}$. It has been found that the high ductility of copper, compared with, for example, a typical steel, nevertheless enables a very stable connection to ion-selective glasses and to common enamels for steels, even under thermal or mechanical loads. Here, the compressive stress in the enamel layer in the cooled state remains only so high that flaking and cracking is counteracted. A sensor element for a potentiometric sensor can accordingly also have a substrate and an ion-selective enamel layer arranged on the substrate, wherein the substrate has at least one region electrically conductively connected to the ion-selective enamel layer, and wherein the region of the substrate electrically conductively connected to the ion-selective enamel layer is made of copper. Such a sensor element can be produced in a very similar manner as the sensor element described here, which has at least one region electrically conductively connected to the ion-selective enamel layer, which region is formed from a copper-based alloy, and can be designed entirely analogously, as described in the following for this sensor element. Copper-based alloys that contain further components, for example zinc or tin, in addition to copper, are less ductile than pure copper and impart higher mechanical stability to the sensor element against mechanical loads. In an analogous manner, copper-based alloys with a copper content of at least 60% (mass fraction), however, also prove to be ductile enough to keep the compressive stress acting on the enamel layer in the cooled state to a minimum, as in the case of a pure copper substrate.

The ion-selective enamel layer applied to the region of the substrate consisting of the copper-based alloy can have a thickness of less than 500 µm, preferably of less than 300 µm or even less than 200 µm or even of only less than 100 µm.

Suitable copper-based alloys are each formed or produced with a defined composition of copper as the main constituent having a mass fraction of at least 60% and further alloy constituents.

The copper-based alloy can advantageously comprise zinc or tin as additional alloy constituents. Suitable copper-based alloys are, for example, the red brass alloys used in the jewelry industry or in special apparatus engineering, such as e.g. CuZn10.

Advantageously, the region of the substrate made of the copper-based alloy that is electrically conductively connected to the enamel layer is in contact with the enamel layer via a transition zone comprising copper(I)-oxide. This transition zone can form, at least in part, during enameling, i.e., during the application of the enamel layer, as a result of processes of corrosion, dissolution, and transport. Copper from the region of the substrate covered by the enamel layer that forms is oxidized to monovalent copper (also referred to as Cu(I) or copper(I)), which occurs both in the copper-based alloy of the substrate in a region close to the surface and in the glass forming the enamel layer and acts as a very good adhesive agent via chemical bonds between the region of the substrate consisting of the copper-based alloy and the glass of the enamel layer.

In one possible embodiment, the transition zone can be an oxide layer comprising copper(I) or copper(I)-oxide having a thickness of less than 5 µm, preferably of less than 2 µm, more preferably of less than 1 µm. A minimum thickness of the layer can be 0.05 µm or less. In an advantageous embodiment, the layer comprising copper(I)-oxide is produced by a method step preceding the enameling that involves conditioning, for example a thermal treatment or a plasma treatment, of the substrate surface. In addition to copper(I)-oxide, the layer comprising copper(I)-oxide can also contain a portion of copper(II)-oxide and oxides of further alloy constituents.

In one possible embodiment, the substrate can be a body formed from the copper-based alloy having a mass fraction of at least 80% copper. Alternatively, the substrate can be formed by at least one layer arranged on a base body, especially, a metallic or ceramic base body, wherein the at least one layer consists of the copper-based alloy. The layer can be formed, for example, as a small plate placed on the base body and materially bonded therewith or as a foil of the copper-based alloy placed on the base body and materially bonded therewith.

The copper-based alloy can be, for example, Cu1−xSnx or Cu1−xZnx, where x≤0.1 in each case. These alloys with, for example, a mass fraction of copper of more than 90% have, as described further above, the advantage of higher mechanical stability while still having sufficient ductility.

The ion-selective enamel layer can be formed from an ion-selective glass, especially, a pH-membrane glass. Such an ion-selective glass can be formed at least from the following constituents: silicon oxide ($SiO_2$), at least one alkali metal oxide ($R_2O$, where R=Li, Na, K, Rb, or Cs), and at least one alkaline earth metal oxide (RO, where R=Mg, Ca, Sr, Ba). Optionally, the components forming the ion-selective glass may comprise a plurality of alkali metal oxides and/or a plurality of alkaline earth metal oxides. Optionally, the ion-selective glass can contain further additives. such as boron oxide ($B_2O_3$). If the ion-selective enamel layer is intended for pH measurement, it can contain sodium and/or lithium. Lithium-containing glasses show a low or negligible cross-sensitivity to sodium ions in the measurement medium, while pH glasses containing sodium are generally easier to apply to a substrate by enameling. A lithium-containing, sodium-free glass, or alternatively a sodium-containing, lithium-free glass, is suitable as pH glass, for example.

The ion-selective enamel layer can be designed as a single-layer or multi-layer coating. Multi-layer application of the coating reduces the risk of the enamel layer not being completely closed and thus the danger of the measuring medium reaching the surface of the substrate during the measurement operation of the sensor element.

The single-layer or multi-layer coating can be applied to the region of the substrate consisting of the copper-based alloy or to the layer comprising copper(I)-oxide arranged on the surface of the region consisting of the copper-based alloy.

In an advantageous embodiment, the sensor element comprises a preamplifier and/or an impedance transformer which can be connected to a potentiometric sensor circuit. One input of the preamplifier can be connected to the region of the substrate which serves as an electrically conductive potential terminal lead of the sensor element and is electrically conductively connected to the ion-selective enamel layer, and a second input can be at a housing potential or at a virtual ground of the sensor circuit as reference potential. For example, if the sensor element is a component of a potentiometric sensor in which it serves as a measuring electrode and which furthermore has a reference electrode and a sensor circuit, which is configured to detect a voltage between the measuring electrode and the reference electrode and to generate a measurement signal as a function of this voltage, the preamplifier or impedance transformer can serve to increase the signal-to-noise ratio of the measurement signals. This is especially advantageous if the ion-selective layer has a high impedance.

The preamplifier can be arranged in a cavity within the already mentioned base body or in a housing at least partially surrounding the sensor element or in a sheath of an electrically insulating material surrounding a unit comprising at least the enamel layer and the substrate.

The invention also comprises a potentiometric sensor having at least one sensor element according to one of the above-described embodiments,
  a reference electrode, and
  a sensor circuit which is electrically conductively connected to the sensor element and to the reference electrode, wherein the sensor circuit is configured to detect a potential difference between the sensor element and the reference electrode.

The method according to the invention for manufacturing a sensor element for a potentiometric sensor comprises applying an ion-selective, especially, pH-selective, enamel layer to a region of a substrate consisting at least of a copper-based alloy with a mass fraction of at least 60% copper. The method according to the invention can serve to produce the sensor element described above.

In this method, a fully functional sensor element suitable for measuring an ion concentration or a pH value is produced in one enameling step. In the sense of the definition given at the outset, the enameling step can comprise the application of an enamel preparation with subsequent thermal treatment to form an enamel coating on the substrate or the melting or fusing of the glass forming the enamel layer onto the region of the substrate. The method described here and below can thus be used in a very simple manner for manufacturing a sensor element with a solid terminal lead for a potentiometric sensor.

When the enamel layer is applied, a transition zone comprising a copper(I)-oxide or copper(I) is produced on an interface between the region of the substrate and the enamel layer that forms, via which zone the region of the substrate is in electrically conductive contact with the enamel layer. The transition zone can be electron- and/or ion-conducting. The transition zone can form in a temperature range between 400 and 1085° C.

In a first embodiment, applying the ion-selective enamel layer to the region of the substrate can comprise the following steps:
  applying an enamel preparation of an ion-selective glass, especially, a pH-glass, to the region of the substrate; and
  thermally treating the enamel preparation applied to the substrate to form the ion-selective enamel layer.

The thermal treatment of the enamel preparation can take place at least intermittently at a temperature between 400° C. and 1085° C.

The enamel preparation can be manufactured as a powder comprising at least glass particles from the ion-selective glass, especially, the pH glass, or as a liquid or paste-like preparation (also referred to as enamel slip) comprising at least glass particles from the ion-selective glass, especially the pH glass. It can contain further additives.

In an advantageous embodiment of the method, formation of the more highly oxidized copper(II) oxide CuO is counteracted. CuO formed on the substrate surface is more poorly wetted by ion-selective glasses and can lead to defects in the glass coating. The temperature sequence of the thermal treatment is therefore advantageously adapted in such a way that CuO formation is counteracted, e.g., in that the substrate with the enamel preparation applied is exposed to high temperatures over as short a period of time as possible. Advantageously, the enamel preparation can contain substances which form low-melting salts, e.g., boric acid hydrates, nitrates, or carbonates. These can form a protective film on the substrate during heating.

In a second embodiment, applying the ion-selective enamel layer to the region of the substrate can comprise:
  applying a glass body made of an ion-selective glass to the region of the substrate and fusing the glass body to the substrate to form the ion-selective enamel layer. The fusing can take place, for example, by means of a thermal treatment in a furnace or by heating with a gas flame or with a laser. In an advantageous method embodiment, the temperatures occurring in the process are at least temporarily in the range between 400° C. and 1085° C.

This method variant has the advantage that CuO formation at the substrate surface does not occur or occurs only to a small degree during the melting or fusing of the glass body and the formation of the desired $Cu_2O$ is promoted.

In a third embodiment, applying the ion-selective enamel layer to the region of the substrate can comprise:
  applying a melt of an ion-selective glass to the region of the substrate and allowing the melt to solidify to form the ion-selective enamel layer. The solidification of the melt can optionally be accomplished by defined cooling, for example, actively controlled or regulated cooling.

The application of the ion-selective enamel layer to the region of the substrate can in a classic manner be accomplished in air in all of the method embodiments described here. Alternatively, the application of the enamel layer in all of the method designs described here can be carried out entirely or partially under an oxygen-free or low-oxygen atmosphere or under inert gas. For example, nitrogen or a noble gas, for example argon, is suitable as a protective or inert gas. By controlling the oxygen content present in the atmosphere during the application of the ion-selective enamel layer, the respective proportion of the Cu(I)-oxide present in the transition zone, especially in relation to Cu(II)-oxide, likewise present in the transition zone, can be influenced and/or specifically adjusted. Enameling under protective gas or in an oxygen-poor atmosphere counteracts the formation of CuO.

The ion-selective glass used in all of the method embodiments disclosed herein can be a pH glass or a sodium-, potassium-, or lithium-selective glass. If the sensor element is intended for the potentiometric measurement of the pH, a lithium-containing and/or sodium-containing pH glass is preferred. Lithium-containing glasses show a low or negligible cross-sensitivity to sodium ions in the measurement medium, while pH glasses containing sodium are generally easier to apply to a substrate by enameling. The glass can be composed as already stated above in connection with the description of various advantageous embodiments of the sensor element.

The ion-selective enamel layer can be formed, for example, by one or more layers applied successively and one over the other on the region of the substrate to be electrically conductively connected to the enamel layer in order to ensure that it completely covers the substrate. At least one base layer of the multi-layer enamel layer that is applied directly on the substrate can be formed from an electron-conducting and/or ion-conducting enamel, the composition of which is different from an ion-selective glass forming one or more layers lying thereover. The at least one base layer provides electrically conductive contact between the substrate and the cover layers of the ion-selective glass. The at least one base layer can also bring about an improved adhesion of the ion-selective enamel layer to the substrate.

The substrate can be a body formed from the copper-based alloy having a mass fraction of at least 80% copper. The substrate can alternatively be formed by at least one layer arranged on a base body, especially, a metallic or ceramic base body, the at least one layer consisting of the copper-based alloy.

The copper-based alloy can, for example, also contain tin or zinc as a further component in addition to copper. The copper-based alloy can be, for example, Cu1−xSnx or Cu1−xZnx, where x≤0.1 in each case. As described further above, these alloys have the advantage of higher mechanical stability with ductility that is still sufficient.

The method can comprise, as a further step, the conditioning of at least the region of the substrate consisting of the copper-based alloy for producing a monovalent oxide layer having copper (Cu(I)) on the surface of the region of the substrate. The conditioning can take place during or before application of the ion-selective enamel layer. The conditioning can comprise, for example, a passivation, especially by a thermal pretreatment or a plasma pretreatment. Due to the conditions prevailing during conditioning, e.g. the temperature and/or oxygen content of the environment, the proportion of monovalent copper in the oxide layer produced by the conditioning can be adjusted in a controlled or targeted manner. The conditioning can comprise passivation by thermal treatment at a temperature between 300 and 600° C., advantageously between 400 and 500° C. The passivation can be carried out in an oxygen-depleted atmosphere, for example in an atmosphere that has essentially one or more inert gases, for example nitrogen, and oxygen at a partial pressure of 0.001 and 10 hPa. This low oxygen content is sufficient to produce on the surface of the substrate a thin, copper(I)-containing oxide layer, for example having a thickness between 0.05 and 2 µm.

It has been found that such a pretreatment and the resulting presence of a copper(I)-containing oxide layer on the substrate surface leads to the formation of a homogeneous and low-defect enamel layer during the subsequent enameling. This is accompanied by improved stability with respect to mechanical loads and by improved sensor behavior, especially an increase in the sensor gradient of the sensor element or of a potentiometric sensor comprising the sensor element, in comparison with enameled untreated copper-based alloy substrates. Advantageously, the oxide layer having copper(I)-oxide formed during the conditioning or passivation has a thickness of less than 5 µm, preferably 2 µm. It is apparent that substantially thicker oxide layers are less stable and can partially detach.

In addition to copper(I), the layer thus produced can also contain a preferably small proportion of copper(II) and further alloying constituents in oxidized form. It is advantageous for the production of sensor elements of reproducible mechanical and/or sensory quality that by controlling the oxygen content a controllable, especially a defined, copper(I) portion in the oxide layer having copper(I) can be generated. As a result of the conditions selected during the conditioning, an oxide layer defined in particular with regard to its Cu(I) portion can be produced in a reproducible manner on the substrate, which accordingly also has defined, especially reproducible, wetting properties during enameling. These properties of the conditioned substrate surface are, especially, also independent of the composition of the enamel to be applied or the glass to be fused on. This advantage is brought to bear, for example, by the conditioning being carried out in a separate step upstream of the enameling.

The conditioning of the region of the substrate can comprise a thermal pretreatment, for example in an oven, by means of a flame or by means of a laser. Alternatively, the conditioning of the substrate can comprise plasma treatment of the surface, for example in an oxygen plasma. The conditioning can also be performed by applying an oxide layer by means of a coating process from the gas phase, for example by (reactive) sputtering, CVD (chemical vapor deposition) or ALD (atomic layer deposition).

After application of the ion-selective enamel layer, the monovalent copper-containing oxide layer formed during conditioning can remain at least partially as a component of the transition zone, but can also be completely dissolved in the transition zone during the application of the enamel layer.

The application described further above of the ion-selective enamel layer at least to the region of the substrate can be carried out subsequently, in a single enameling step or several enameling steps. In this way, the enamel layer is applied to the oxide layer having Cu(I) and previously produced by the conditioning. Advantageously, the enamel layer is applied in a single-stage enameling step in which a single ion-selective enamel layer is produced. However, applying the enamel layer in several layers is not ruled out. If the enamel layer is applied in a single-stage enameling step, this enables the production of a particularly thin ion-selective enamel layer. The defined oxide layer in the region of the substrate to be enameled, which layer is produced by conditioning and has Cu(I), shows a defined wetting behavior during enameling, so that enamel defects are minimized, and the enamel layer can be applied in one layer and/or relatively thinly, preferably having a thickness of less than 500 µm. Advantageously, the enamel layer can even be applied with a thickness of less than 300 µm, less than 200 µm or even less than 100 µm, wherein the enamel layer covers the underlying region of the substrate as a substantially closed layer, especially in a liquid-tight manner, despite this minimal thickness.

The method can furthermore comprise the following step: sheathing a unit comprising at least the enamel layer and the substrate with an electrically insulating material such that a sheath formed in this way leaves free, in a region of the sensor element intended for contact with a measuring medium, only a surface of the enamel layer facing away from the substrate. An electrical conductor contacting the substrate can be passed through the sheath in order to contact the substrate from outside the sheath.

The method step of sheathing the unit comprising the enamel layer and the substrate can comprise: applying a powder comprising glass particles or a suspension or paste comprising glass particles to the unit; and thermally treating the applied powder or the suspension or paste to form a glass layer forming the sheath.

Alternatively, the method step of sheathing can also comprise applying a glass melt to the unit and cooling the glass melt or overmolding the unit with a plastic or ceramic.

The invention also comprises a sensor element manufactured according to the previously described method, for example in one of its variants described here. The sensor element thus produced can have the structural and functional properties of the sensor element described above. It is also possible in principle in the method described above or in one of the method variants described herein to apply the ion-selective enamel layer to a region of a substrate that consists of copper, in order to produce a sensor element for a potentiometric sensor. A sensor element produced according to the method described above can be used as a measuring electrode in a potentiometric sensor for measuring an ion concentration or a pH in a measuring liquid. The potentiometric sensor can further have a potential-stable reference electrode and a measuring circuit, wherein the measuring circuit generates a measurement signal that is dependent on a voltage between the reference electrode and the measuring electrode.

BRIEF DESCRIPTION OF THE DRAWINGS

The invention is explained in further detail below on the basis of the exemplary embodiments shown in the figures.
The following are shown.

DETAILED DESCRIPTION

Figure 1:
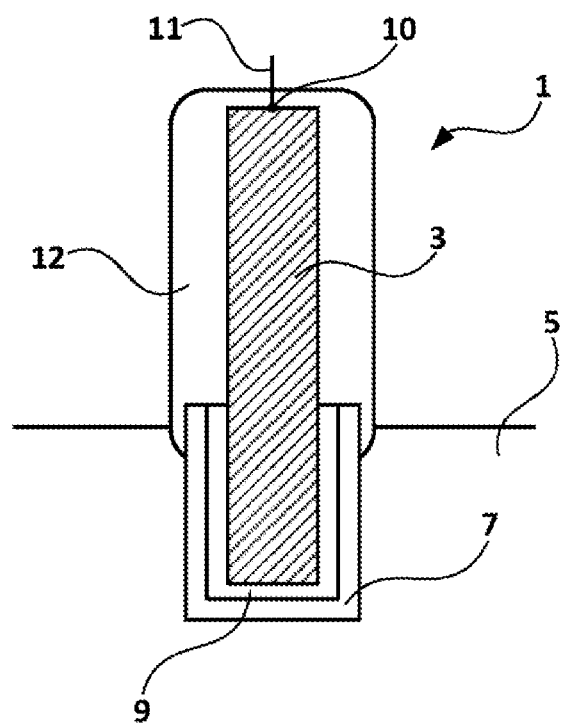
FIG. 1 shows a schematic longitudinal sectional view of a sensor element for a potentiometric sensor according to a first exemplary embodiment.

FIG. 1 schematically shows a sensor element 1 for a potentiometric sensor according to a first exemplary embodiment in a longitudinal section. The sensor element 1 has a substrate 3 in the form of a rod-shaped body made of a copper-based alloy having a mass fraction of at least 60% and an ion-selective enamel layer 7 serving as a sensor layer that is arranged directly on the substrate 3 in a front region intended for contact with a liquid, especially an aqueous, measuring medium 5. In the present example, the enamel layer 7 consists of a sodium- or pH-selective glass, e.g., MacInnes glass, Corning 015 glass, or any of the glasses known from U.S. Pat. No. 3,458,422. The glasses mentioned in U.S. Pat. No. 3,458,422 contain a portion of $Li_2O$ and are free of $Na_2O$ so that the cross-sensitivity of pH measurements with a sensor layer of one of these glasses is reduced. Alternatively, however, pH glasses containing sodium can also be used.

The enamel layer 7 can be applied to the substrate 3 in one or more layers arranged one above the other. An electrically conductive, i.e., electron- and/or ion-conducting, transition zone 9 is formed between the substrate 3 and the enamel layer 7. The thicknesses and thickness ratios of the transition zone 9 and the enamel layer 7 are shown greatly exaggerated in FIGS. 1-3. While the enamel layer 7 is being applied, the transition zone 9 is formed at least in part by enameling as a result of redox reactions (e.g., corrosion) and transport processes (e.g., diffusion) at the temperatures occurring in the process. In the transition zone, copper(I) oxide is present both in the region of the substrate 3 covered by the enamel layer 7 and in the glass forming the enamel layer 7. Chemical bonding of the $Cu_2O$ present in the transition zone 9, the enamel layer 7, and the substrate 3 therefore results in good adhesion of the enamel layer 7 to the substrate 3. This transition zone 9 remains stable even after enameling, i.e., after formation and cooling of the enamel layer 7. It produces a good electrically conductive connection between the enamel layer 7 serving as an ion-selective sensor layer and the substrate 3 serving as potential terminal lead.

The substrate 3 and the transition zone 9 serve as a solid terminal lead for an electrode potential forming on the ion-selective enamel layer 7 in contact with the measuring medium 5. On the rear side, i.e., on the side facing away from the measuring medium 5, the substrate 3 has a contact point 10 at which an electrical conductor 11, e.g., a metallic wire or a conductor path, is electrically contacted to the substrate 3. This conductor 11 can be connected to a sensor circuit of a potentiometric sensor.

The sensor element 1 moreover has a sheath 12, which is formed by an insulation enamel layer in the present example. Alternatively, the sheath can be formed from a polymer instead of an enamel layer of glass. It surrounds the body forming the substrate 3 and an edge region of the layers 7 and 9 intimately so that no liquid, especially, not the measuring medium 5, reaches the substrate 3.

The sheath 12 can be produced using methods that are known in connection with enameling metal substrates. Suitable materials for the sheath 12 and suitable methods for applying the sheath 12 to the unit formed from the substrate 3 and the ion-selective enamel layer 7 with the transition zone 9 arranged between them can be taken from, for example, EP 1 231 189 A1. The sheath 12 can be produced by applying particles of a glass composition to the substrate 3 and the enamel layer 7 and subsequent thermal treatment.

Figure 2:
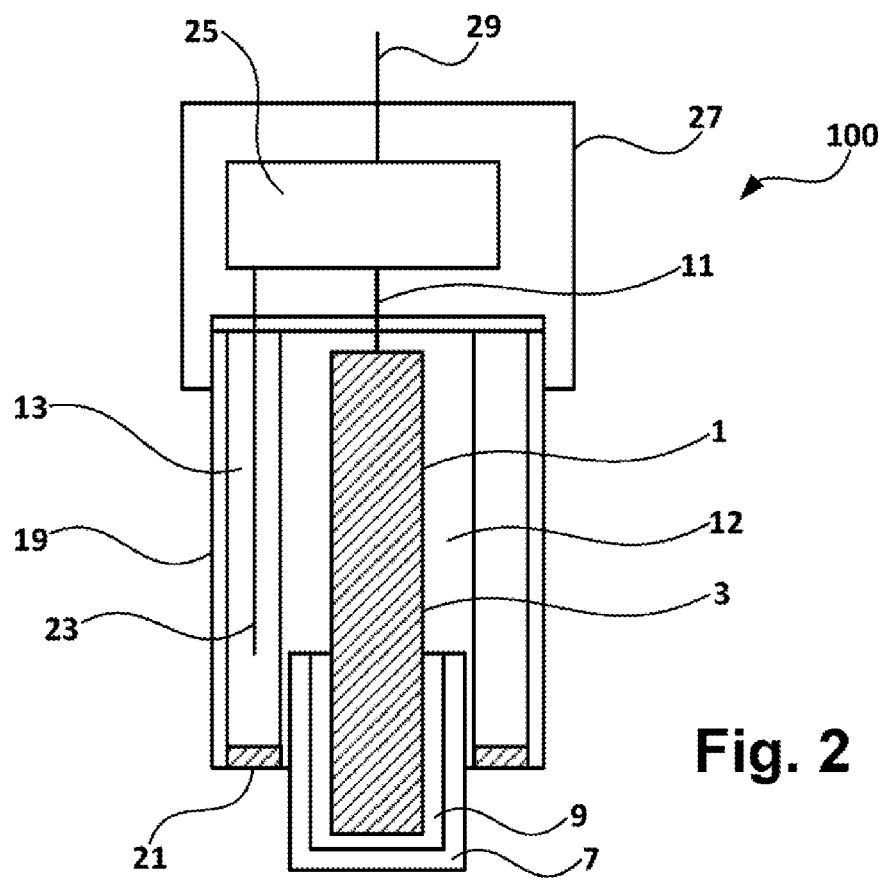
FIG. 2 shows a schematic longitudinal sectional view of a potentiometric sensor with the sensor element according to the first exemplary embodiment.

FIG. 2 shows a schematic longitudinal sectional view of a potentiometric sensor 100 for measuring an activity or concentration of an analyte ion or a measured variable dependent thereon, e.g., a pH value, with a sensor element 1 as measuring electrode and a reference electrode 13.

The sensor element 1 substantially structurally corresponds to the sensor element 1 shown in FIG. 1. It has, as a sensor layer, an ion-selective enamel layer 7 that is applied to a cylindrical body made of a copper-based alloy serving as substrate 3, wherein a transition zone 9 comprising copper(I)-oxide is formed between the enamel layer 7 and the substrate. The sensor element 1 furthermore comprises a sheath 12 which surrounds the substrate 3 and leaves free only a surface of the enamel layer 7 intended for contact with the measuring medium, said sheath being made of an insulation enamel or of a polymer which insulates the substrate 3 and an edge region of the enamel layer 7 or the transition zone 9 from the liquid medium.

The reference electrode 13 can be designed as a conventional electrode of the second type, e.g., as a silver/silver chloride electrode. In the example shown here, it comprises a tubular housing 19 which surrounds a section of the sheath 12 of the substrate 3 and which is closed at its front end facing the measuring medium by an annular diaphragm 21. The diaphragm 21 can be formed, for example, from a plastic, e.g., PTFE, or from a porous ceramic, e.g., a $ZrO_2$ ceramic. The annular chamber formed between the sheath 12 and the housing 19 contains a reference electrolyte, e.g. a KCl solution, in which a reference element 23, e.g. a silver electrode coated with silver chloride, is immersed. Instead of a diaphragm 21, the reference electrode 13 can also have another bridge that establishes an ion-conducting and/or an electrolytic contact between the reference electrolyte and the measuring medium. The annular chamber containing the reference electrolyte is closed on its rear side, e.g., by casting or adhesive bonding.

The substrate 3 is connected via a first electrical line 11 to a sensor circuit 25 and thus forms the measuring electrode of the potentiometric sensor 100. The sensor circuit 25 is accommodated in an electronics housing 27 connected to the reference and measuring electrode of the sensor 100. The reference element 23 is passed out of the annular chamber through the casting or bonding and is also connected to the sensor circuit 25. The sensor circuit 25 is configured to detect a voltage arising in contact of the diaphragm 21 and of the ion-selective enamel layer 7 with the measuring medium between the measuring electrode 1 and the reference electrode 13. This voltage is a function of the activity of the analyte ion present on the ion-selective enamel layer 7. The sensor circuit 25 can be configured to generate a measurement signal representing the detected voltage and to output it, e.g., to a measuring transducer that is connected to the sensor circuit 25 and processes the measurement signal, and to determine therefrom, using a predetermined calibration function, a measured value of the ion concentration of the analyte ion or, if the potentiometric sensor 100 is designed as a pH sensor, of the pH value. Alternatively, the sensor circuit 25 can also be configured to determine the measured value and to output it via an interface 29 to a measuring transducer or another operating or display device.

Figure 3:
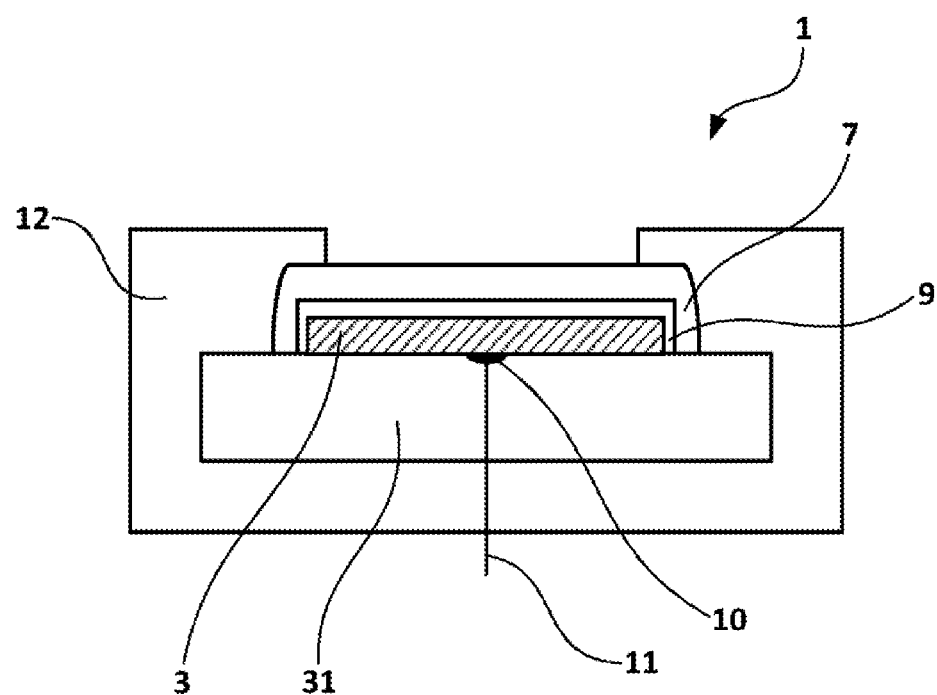
FIG. 3 shows a schematic longitudinal sectional view of a sensor element for a potentiometric sensor according to a second exemplary embodiment.

FIG. 3 schematically shows another exemplary embodiment of a sensor element 1 for a potentiometric sensor. This sensor element 1 has a base body 31 made of a ceramic or glass ceramic, on which a substrate 3 formed from a metal alloy is arranged in the form of a layer. The layer can be formed by a small plate bonded, adhesively bonded, or otherwise fastened to the base body or by a foil of a copper-based alloy. The ceramic of the base body can, for example, be a zirconium oxide ceramic or an aluminum oxide ceramic.

An ion-selective enamel layer 7 serving as a sensor layer is applied to the substrate 3. A transition zone 9 containing copper(I) oxide is arranged between the enamel layer 7 and the substrate 3. Enameling of the substrate 3 with simultaneous formation of the transition zone 9 can be carried out in the same way as disclosed above with reference to the exemplary embodiment described in FIG. 1.

The transition zone 9 is electrically conductive, e.g., ion- and/or electron-conducting, and together with the substrate 3 forms the solid terminal lead of the sensor element 1. At a contact point 10, the substrate 3 is contacted on its rear side by an electrical conductor 11 which is passed through the base body 31 and which can connect the sensor element 1 to a sensor circuit of a potentiometric sensor. The unit formed by the base body 31, the substrate 3, the transition zone 9, and the ion-selective enamel layer is embedded in a glass sheath 12 which leaves free only a surface region of the ion-selective enamel layer 7 and which insulates the interfaces between the substrate 3 and the base body 31 and between the substrate 3 and the overlying layers from a measuring medium.

Optionally, the sensor element can comprise a preamplifier and/or an impedance transformer (not shown here) which serves to increase the signal-to-noise ratio of the measurement signal of the sensor element or of a potentiometric sensor with the sensor element. The integration of a preamplifier in the signal path close to the ion-selective enamel layer is especially advantageous if the ion-selective enamel layer has a high impedance.

A potentiometric sensor comprising the sensor element 1 shown here as a measuring electrode can have a reference electrode that is also completely formed by a layer stack and whose potential terminal lead is designed as a solid terminal lead. Both electrodes may be arranged on a common base body, e.g., a circuit board or a non-conductive ceramic, and be connected to a sensor circuit via electrical lines, e.g., conductor paths extending on the base body. In this way, a very compact potentiometric sensor may be realized.

To produce the sensor elements 1 shown in FIGS. 1 to 3, the enameling of the substrate 3 can be carried out in the following way:

In a first method variant, an enamel preparation, e.g., a powder formed from glass particles of the ion-selective glass or a suspension or paste containing glass particles of the ion-selective glass, can be applied to the surface of the substrate 3 and heated to a temperature between 800 and 850° C., depending on the composition of the ion-selective glass. The thermal treatment forms the enamel layer 7 and at the same time, at least in part, the transition zone 9. This method has been shown to be highly suitable for the application of an enamel layer 7 containing lithium and/or sodium. Since the glass forming the enamel layer 7 wets a CuO-containing surface significantly more poorly than a $Cu_2O$-containing or copper-containing surface, it is advantageous in this embodiment to suppress the formation of CuO on the substrate surface. For this purpose, the enamel preparation can advantageously contain constituents that form low-melting salts, such as boric acid hydrates, carbonates, or nitrates. Advantageously, the thermal treatment takes a few minutes, e.g., less than 15 min.

In a second method variant, a glass body, e.g., a glass plate, of the ion-selective glass can be placed and fused onto the substrate 3. Temperatures in the range of 400° C. and 1085° C. should also be reached here in order to ensure that, in addition to the enamel layer being produced, the ion-selective enamel layer 7 and the transition zone 9 containing Cu(I) are formed.

This method has proven to be especially suitable for lithium-free, sodium-containing pH-selective glasses and sodium-selective glasses. It is advantageous in this method that CuO formation at the surface of the substrate 3 during the fusing of the glass body is not observed.

In a further method variant, the substrate 3 can be conditioned, for example passivated, before the enameling, in order to produce a copper(I)-oxide-containing, i.e. monovalent copper-containing oxide layer on the substrate surface, which oxide layer can form part of the transition zone 9 after the enamel layer 7 has been applied. Depending on the conditions prevailing during the enameling, the oxide layer can, however, also be at least partially or even completely dissolved in the transition zone 9 during the application of the enamel layer.

The oxide layer having copper(I) can be produced by a thermal treatment of the surface of the substrate 3, for example in a flame, by means of a laser or in an oven, in air or under an oxygen-lean or oxygen-free protective gas atmosphere. Likewise, the oxide layer can be produced by treatment in an oxygen plasma or by coating methods such as sputtering or vapor deposition. The ratio in which copper (I) and copper(II) are present in the oxide layer can be controlled by adjusting the process conditions and the amount of oxygen provided. For example, the substrate can be heated for passivation to a temperature of 400 to 500° C. in an atmosphere of protective gas, for example nitrogen, having a low oxygen content. This can be performed, for example, in a furnace chamber purged continuously with nitrogen in which an oxygen partial pressure around 0.8 hPa prevails. The thermal treatment produces an oxide layer that contains a high proportion of monovalent copper Cu(I). The layer has a thickness of less than 5 µm or even less than 1 µm. In addition to monovalent copper, the oxide layer can also contain Cu(II) and oxides of further alloying constituents. The Cu(I) portion in the oxide layer can be controlled or selectively adjusted via the conditions prevailing during the passivation (e.g., temperature program, gas atmosphere, especially the oxygen content thereof). This allows, for example, reproducible conditioning of the substrates for a subsequent enameling to produce a plurality of sensor elements having similar properties.

The ion-selective glass layer can be applied to the passivated surface of the substrate by enameling, for example by the application of the enamel preparation described further above, also referred to as enamel slip, and subsequent thermal treatment of the preparation to form an enamel layer, or by fusing a glass platelet. Preferred layer thicknesses of the oxide layer after passivation are between 0.05 and 2 µm, preferably less than 1 µm. Substantially thicker oxide layers produced on a copper-based alloy with copper as the main component, e.g. those having a thickness of more than 20 µm, can very easily detach as scale from the metallic substrate. Layers having the indicated layer thickness by contrast adhere firmly and also bring about a good adhesion of the enamel layer also after the subsequent application of the enamel layer. It also appears that the preceding passivation of the metal surface results in uniform wetting of the metal or alloy surface during the enameling step so that the enamel layer formed has significantly fewer enamel defects, such as cracks, irregularities or pores, than an enamel layer applied to a non-passivated substrate. Accordingly, the enamel layer on the passivated substrate can be applied relatively thinly and nevertheless cover the substrate in a liquid-tight manner. This makes it possible to provide a comparatively low-impedance sensor layer for the sensor element. Ion-selective enamel layers of conventional enamel electrodes according to the prior art are usually thicker than ion-selective membranes of conventional glass electrodes with liquid discharge, in order to ensure that the enamel layer covers the potential discharge of the enamel electrode in a liquid-tight manner. Accordingly, the ion-selective enamel layers of conventional enamel electrodes have a higher impedance than the glass membranes of conventional glass electrodes. In order to compensate for this, the surface of the ion-selective enamel layers is chosen to be relatively large for conventional enamel electrodes used in the process industry so that a conventional enamel electrode requires significantly more installation space than a conventional glass electrode with liquid discharge. By contrast, the ion-selective enamel layer of a sensor element which is produced according to the method described here can have a thickness of less than 500 µm, or of less than 300 or 200 µm, or even of less than 100 µm. The surface of the ion-selective enamel layer can thus likewise be kept small in order to provide a sensor element with little installation space required.

As already mentioned at the outset, the application of the ion-selective enamel layer can be carried out by enameling in a conventional manner in air or in an oxygen-free or low-oxygen protective gas atmosphere, in order to influence the proportions of Cu(I) and Cu(II) present in each case in the transition zone produced here between substrate and the glass layer that forms.

The invention claimed is:

1. A sensor element for a potentiometric sensor, comprising:
    a substrate, and
    an ion-selective enamel layer arranged on the substrate, wherein the substrate has at least one region electrically conductively connected to the ion-selective enamel layer via a transition zone,
    such that the at least one region of the substrate electrically conductively connected to the ion-selective enamel layer is made of a copper-based alloy with a mass fraction of at least 60% copper,
    wherein the transition zone has a layer comprising copper (I) oxide with a thickness of less than 5 µm.

2. The sensor element of claim 1, wherein the substrate is a body formed from the copper-based alloy having a mass fraction of at least 80% copper.

3. The sensor element of claim 1, wherein the substrate is formed by at least one layer arranged on a base body, wherein the at least one layer consists of the copper-based alloy.

4. The sensor element of claim 1, wherein the copper-based alloy is Cu1-xSnx or Cu1-xZnx, wherein x denotes mass fraction and x<0.1.

5. The sensor element of claim 1, wherein the ion-selective enamel layer is formed from an ion-selective glass.

6. The sensor element of 1, wherein the ion-selective enamel layer is configured as a single- or multi-layer coating applied to the layer comprising copper (I) oxide arranged on a surface of the at least one region consisting of the copper-based alloy.

7. A potentiometric sensor comprising:
    a sensor element comprising:
        a substrate, and
        an ion-selective enamel layer arranged on the substrate, wherein the substrate has at least one region electrically conductively connected to the ion-selective enamel layer via a transition zone,
        such that the at least one region of the substrate electrically conductively connected to the ion-selective enamel layer is made of a copper-based alloy with a mass fraction of at least 60% copper, wherein the transition zone has a layer comprising copper (I) oxide with a thickness of less than 5 µm,
    a reference electrode, and
    a sensor circuit electrically conductively connected to the sensor element and the reference electrode, wherein the sensor circuit is configured to detect a potential difference between the sensor element and the reference electrode.

* * * * *